United States Patent [19]
Nettleton

[11] Patent Number: 5,847,270
[45] Date of Patent: Dec. 8, 1998

[54] STYLUS ATTACHMENT FOR A METROLOGICAL INSTRUMENT

[75] Inventor: David John Nettleton, Leicester, England

[73] Assignee: Taylor Hobson Limited, England

[21] Appl. No.: 809,446

[22] PCT Filed: Oct. 17, 1995

[86] PCT No.: PCT/GB95/02450

§ 371 Date: Jun. 13, 1997

§ 102(e) Date: Jun. 13, 1997

[87] PCT Pub. No.: WO96/12929

PCT Pub. Date: May 2, 1996

[30] Foreign Application Priority Data

Oct. 20, 1994 [GB] United Kingdom .................... 9421178

[51] Int. Cl.$^6$ .............................. G01B 5/012; G01B 5/28
[52] U.S. Cl. ............................................ 73/105; 73/866.5
[58] Field of Search ..................................... 73/105, 866.5

[56] References Cited

U.S. PATENT DOCUMENTS

| | | | |
|---|---|---|---|
| 2,733,598 | 2/1956 | Miner | 73/105 |
| 4,574,625 | 3/1986 | Olasz et al. | 73/105 |
| 4,776,212 | 10/1988 | Parsons et al. | 73/105 |

FOREIGN PATENT DOCUMENTS

| | | | |
|---|---|---|---|
| 0 426 492 | 5/1991 | European Pat. Off. . | |
| 28 41 548 | 4/1980 | Germany . | |
| 31 52 731 | 7/1983 | Germany . | |
| 2-284005 | 11/1990 | Japan | 73/866.5 |
| 549987 | 12/1942 | United Kingdom | 73/105 |
| 2 247 528 | 3/1992 | United Kingdom . | |
| 92/21934 | 12/1992 | WIPO . | |

OTHER PUBLICATIONS

Kazuo Yokoyuama et al., "In Situ Tip Exchange Mechanism for the Demuth–Type Scanning Tunneling Microscope," Journal of Vacuum Science and Technology: Part B, vol. 9, No. 2 Part 02, 1 Mar. 1991, pp. 623–625, XP 000222883.

M. Sander, "A Multipurpose Scanning Probe Microscope," Review of Scientific Instruments, vol. 64, No. 9, 1 Sep. 1993, pp. 2591–2594, XP 000395635.

M. Wortge et al., "An ultrahigh–vacuum system for STM Studies," Review of Scientific Instruments, vol. 65, No. 8, Aug. 1994, New York, US, pp. 2523–2526.

*Primary Examiner*—Hezrone E. Williams
*Assistant Examiner*—Daniel S. Larkin
*Attorney, Agent, or Firm*—Lerner, David, Littenberg, Krumholz & Mentlik

[57] ABSTRACT

An arrangement for mounting a stylus on a stylus support for a metrological instrument includes a camming pin on a mounting disc of the stylus support, which passes through a mounting hole in a mounting disc of the stylus. A spring applies a sideways force to a sloping cam surface of the camming pin, which is converted into a force pulling the camming pin through the mounting hole and thus holding the mounting discs together. An operator can deform the spring so that it releases the camming pin, allowing the stylus to be mounted or dismounted without applying significant force to the pivot bearing of the stylus support. If excessive radial force is applied to the stylus arm, the spring will ride up the cam surface allowing the stylus to be released from the stylus support, thereby avoiding applying extreme forces to the pivot bearing.

41 Claims, 8 Drawing Sheets

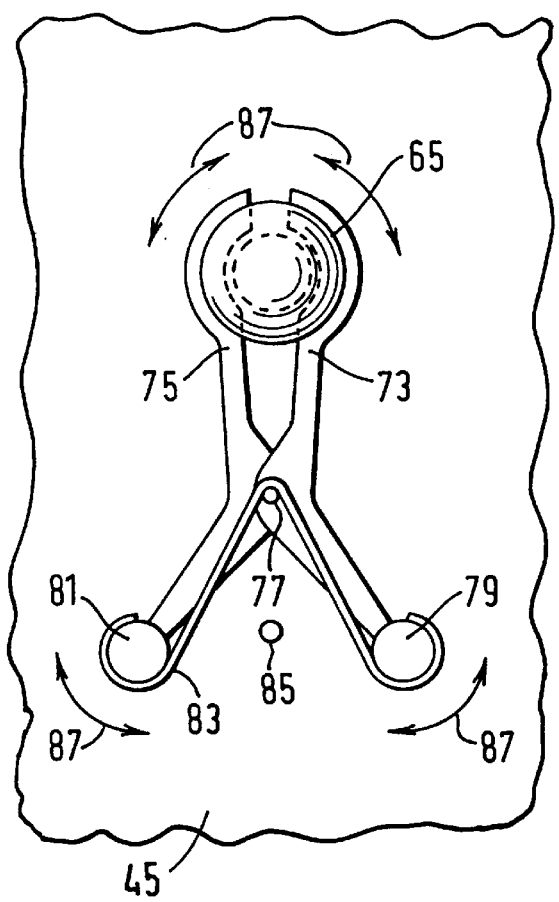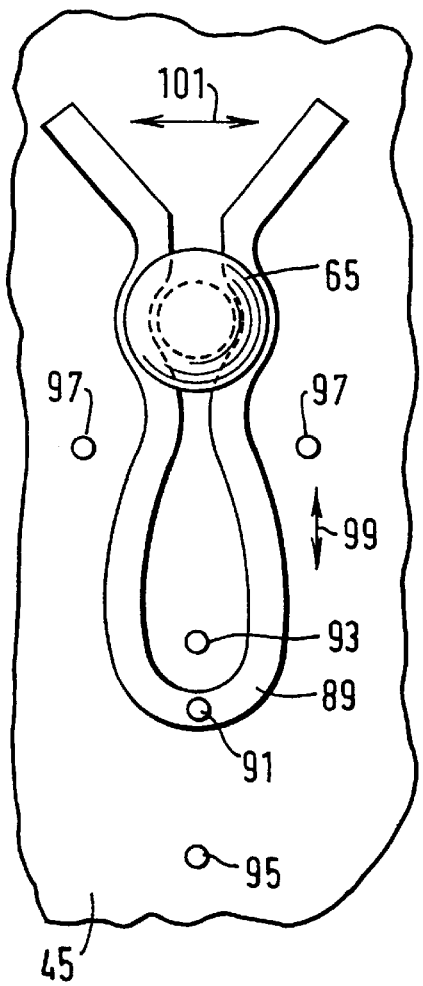

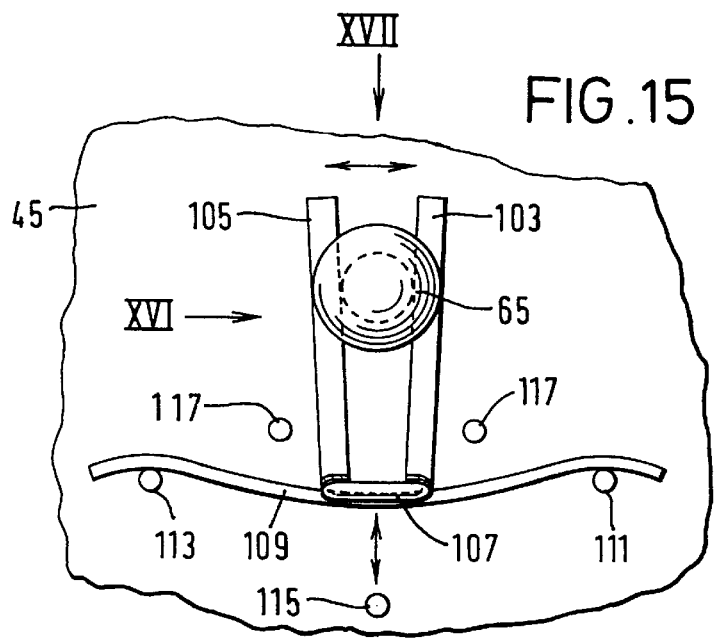
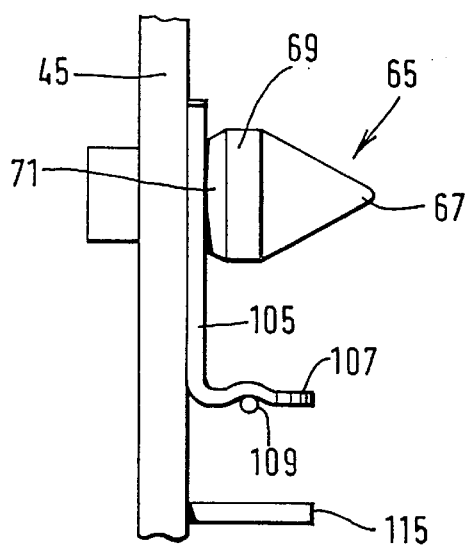
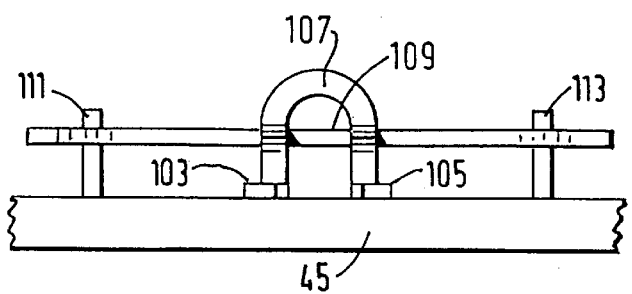

STYLUS ATTACHMENT FOR A METROLOGICAL INSTRUMENT

The present invention relates to a way of attaching a stylus to a metrological instrument for measuring the surface form (shape) or texture (roughness) of a workpiece. The invention has particular-application to instruments of the type in which an arm holding the stylus can be moved generally parallel to the plane of the surface, so as to drive the stylus along the surface to make a measurement traverse. However, it is also applicable to other types of metrological instrument, such as machines for measuring the roundness or surface roughness of a rotating component, in which a support moves the stylus radially towards the surface to be measured until the stylus contacts the surface, and then the radial displacement of the stylus tip is measured while the workpiece rotates.

Metrological instruments are normally made so that the stylus is removable and replaceable. This allows different types of stylus to be fitted to the same machine, and in particular allows the user to change the length of the stylus or the features of the surface-contacting stylus tip. Additionally, it may be desirable to remove the stylus when the instrument is not in use, to avoid damage to the stylus or to the instrument if the stylus is accidentally knocked.

In one known arrangement, a stylus is supported in use for pivotal movement of the tip towards and away from the surface of the workpiece, and the mechanism for moving the stylus over the surface of the workpiece ends with a pivotable stylus support to which the stylus can be fitted. The stylus support is mounted on the remainder of the mechanism through precision bearings to allow the pivoting movement of the stylus. The stylus is connected to the support by pushing its end remote from the stylus tip into a stylus-receiving opening in the stylus support, and the stylus is removed by pulling it out of the opening. These movements are substantially linear movements in the direction along the length of the stylus, generally parallel to the plane of the workpiece surface and generally transverse to the pivot axis. In fitting or removing a stylus, the pushing or pulling force applied to the stylus will be transmitted through the pivot bearings to the remainder of the mechanism, which will be held against movement. Accordingly, it is inherent in this method of attaching a removable stylus that the act of attaching the stylus and the act of removing the stylus will apply substantial stress to the pivot bearing.

In this known arrangement, the stylus is provided with a precision locating surface on the part which is inserted into the stylus support. This surface extends in a plane parallel to the direction of movement for attaching or removing the stylus, and a spring in the stylus support presses this locating surface of the stylus against a kinematic mount in the support to locate the stylus accurately in a known and predetermined orientation. However, since the stylus is normally a narrow cylinder (typically about 3 mm diameter), the locating surface is inevitably small, especially in its direction across the width of the stylus, making it correspondingly difficult to locate the stylus accurately and securely.

With apparatus of this type, damage can result if the stylus is knocked sideways or if an attempt is made to rotate it about the pivot axis beyond the ends of its range of free movement. This may happen through accidentally knocking the stylus. Additionally, it sometimes happens that the instrument is inadvertently operated in a manner such that the stylus is driven over a sloping workpiece surface which lifts the stylus beyond its range of movement. Since such events attempt to move a part of the stylus in a manner which cannot be accommodated by the stylus support, they may lead to snapping or splitting of the stylus. More seriously, such events tend to apply an extreme force to the pivot bearings of the stylus support, and may damage the bearings making the instrument unusable. This is particularly serious because repairing the bearings is more expensive than simply replacing a broken stylus, and additionally the instrument cannot be used until the repair has been carried out.

In EP-A-0426492 there is proposed a metrological probe for continuous measurement, for example measurement of variations in the radius of a cylindrical body rotating about its cylindrical axis, by arranging the probe with its stylus extending generally parallel to the cylindrical axis and measuring sideways displacement of the stylus as the body rotates. The stylus is supported on a stylus mount which is connected to the probe body via a diaphragm spring which allows the stylus to move in its axial direction as well as allowing the stylus to tilt. Since the stylus mount is connected to the body through a diaphragm spring rather than through a pivot, the stylus tip can tilt in any direction. In this proposed probe, the end of the stylus remote from the tip ends with a disc extending in a plane transverse to the stylus axis, and this disc is located on a corresponding disc of the stylus mount by a three-ball kinematic mounting arrangement. The two discs are held together by magnetic attraction, and if the stylus is pushed too far or is knocked in a sideways direction, the forces tending to rotate the stylus overcome the magnetic attraction and the stylus separates from the stylus mount. In order to remove the stylus from the probe, the stylus tip is deliberately pushed sideways to rotate the disc at the end of the stylus away from the disc on the stylus mount. The progressive rotation of the two discs away from each other, initially about a ball of the kinematic mount and then about a point where the periphery of one of the discs touches the other, can be regarded as a peel movement.

The diaphragm spring arrangement for allowing the stylus to move is relatively robust, and can withstand the forces applied to it when the stylus is removed. Since the stylus separates from the mount whenever an extreme sideways force is applied, such forces do not lead to breakage of the stylus or damage of the diaphragm spring arrangement. However, because the three-ball kinematic mount means that the two discs are inevitably slightly spaced from each other, a strong magnet must be used to provide sufficient magnetic force to keep the stylus securely located on the stylus mount, and this consequently increases the weight of the movable assembly composed of the stylus and the stylus mount. On the other hand, the three-ball kinematic location between discs which extend in a plane transverse to the stylus axis and which have a radius substantially greater than the radius of the stylus, provides a stable precision location of the stylus on the stylus mount.

The present invention seeks to reduce at least some of the difficulties in arrangements for attaching a removable stylus discussed above.

According to an aspect of the present invention there is provided an arrangement for attaching a stylus to a stylus support in a metrological instrument, in which one of the parts carries an angled cam surface and the other part carries a spring-loaded cam follower surface, the surfaces being arranged so that action of the cam follower surface on the cam surface under its spring loading generates a mutual force tending to drive locating means on the stylus against complementary locating means on the stylus mount, and movement of the stylus tip in a direction transverse to the axial direction of the stylus tending to move the cam follower over the cam surface in a direction which is initially resisted by the spring loading of the cam follower, but which through continued movement leads to the release of the cam follower from the cam surface and release of the stylus from the stylus mount.

The invention also relates to the stylus and the stylus support separately, and to the method of attachment.

The design of the angles of surfaces and the force of resilient biasing should be selected on any articular occasion depending on the magnitude of the transverse force which is required as a threshold force for separation of the stylus from the stylus support. This will always be a trade-off between the need for the stylus to be fixed securely to the stylus support during normal use, and not to be dislodged by the forces applied to it during a normal measurement operation, balanced against the need to release the stylus before the forces applied to it are sufficiently great to damage it or to damage sensitive components in the metrological instrument such as pivot bearings for the stylus support.

The spring loaded cam follower surface may be a surface of a spring which presses against the cam surface, or it may be a surface of another member which is in turn acted on by a spring.

Preferably, the member providing the cam surface is mounted on the stylus support and the member providing the cam follower surface is mounted on the stylus. The member providing the cam surface will normally require more accurate manufacture and more careful mounting than the cam follower, and therefore will be more expensive. For this reason it is preferable to provide it as part of the relatively expensive metrological instrument, rather than as part of the relatively cheap stylus. Additionally, since a user will normally own more styli than metrological instruments, this arrangement provides lower cost to the user.

In another aspect, the present invention provides an attachment mechanism for removably attaching a stylus to a stylus support in a metrological instrument, comprising a resilient member for applying a force between the stylus and the stylus support, so as to press a locating portion of the stylus against a complementary locating portion of the stylus support, and first and second actuator members which are movable relative to each other to release the stylus and the stylus support from the force of the resilient member and allow the parts to be separated.

In the case where the stylus support is pivotally mounted to the metrological instrument, the actuator members are preferably both on the same side as pivot axis. In any case, the first and second actuator members are preferably both on the same one of the stylus and the stylus support, preferably both on the stylus.

In some embodiments, movement of the first and second actuator members to release the stylus and the stylus support from the force of the resilient member is made against the force of the resilient member, so that the force of the resilient member is taken between the two actuator members. In one embodiment, one of the actuator members moves with a part of the resilient member whereas the other actuator member does not, and the force of the resilient member is taken between the first actuator member and a mounting between the resilient member and the stylus or the stylus support. In another embodiment, both of the actuator members move with respective parts of the resilient member, so that when the actuator members take up the force of the resilient member the force is not transmitted through either of the stylus or the stylus support.

The attachment mechanism of this aspect of the invention can be designed for operation by an automatic stylus release and/or attachment device, or may be designed for manual operation by a human operator. This arrangement of actuator members tends to make it easier for the operation of attaching or removing a stylus to be carried out without significantly stressing mechanically sensitive parts of the metrological instrument such as the pivot or other part which mounts the stylus support onto the remainder of the instrument. Embodiments in which both actuator members and the resilient member are all mounted on the stylus, and the force of the resilient member is applied between the actuator members when the actuator members are in the "stylus released" position, are particularly preferred because in this arrangement the act of holding the actuator members in the "stylus released" position will tend to provide a grip on the stylus, allowing it to be held and offered up to the stylus support without the need to hold or apply any force to the stylus support, and in the case of a human operator this will normally allow a one-handed operation. For this reason, it is particularly preferred that the action of moving the actuator members into the "stylus released" position is a relative movement between the actuator members towards each other when they are to be operated by a human operator, as this allows a squeeze type action, for example between finger and thumb.

In both aspects of the present invention, it is preferred that the locating portions between the stylus and the stylus support provide a kinematic location by a plurality of locating points which define a location plane extending transverse of the direction in which the stylus extends, and the points are spaced substantially further apart than the thickness of the stylus. A three point kinematic mount, such as a three-ball-and-groove kinematic mount is preferred.

Embodiments of the present invention, given by way of non-limiting example, will now be described with reference to the accompanying drawings, in which:

FIG. 13 is a view of a second embodiment of the present invention, corresponding to FIG. 9;

FIG. 14 is a view of a third embodiment of the present invention, corresponding to FIG. 9;

FIG. 15 is a view of a fourth embodiment of the present invention, corresponding to FIG. 9;

FIG. 16 is a view of the fourth embodiment from the direction XVI in FIG. 15;

FIG. 17 is a view of the fourth embodiment from the direction XVII in FIG. 15;

Figure 1:
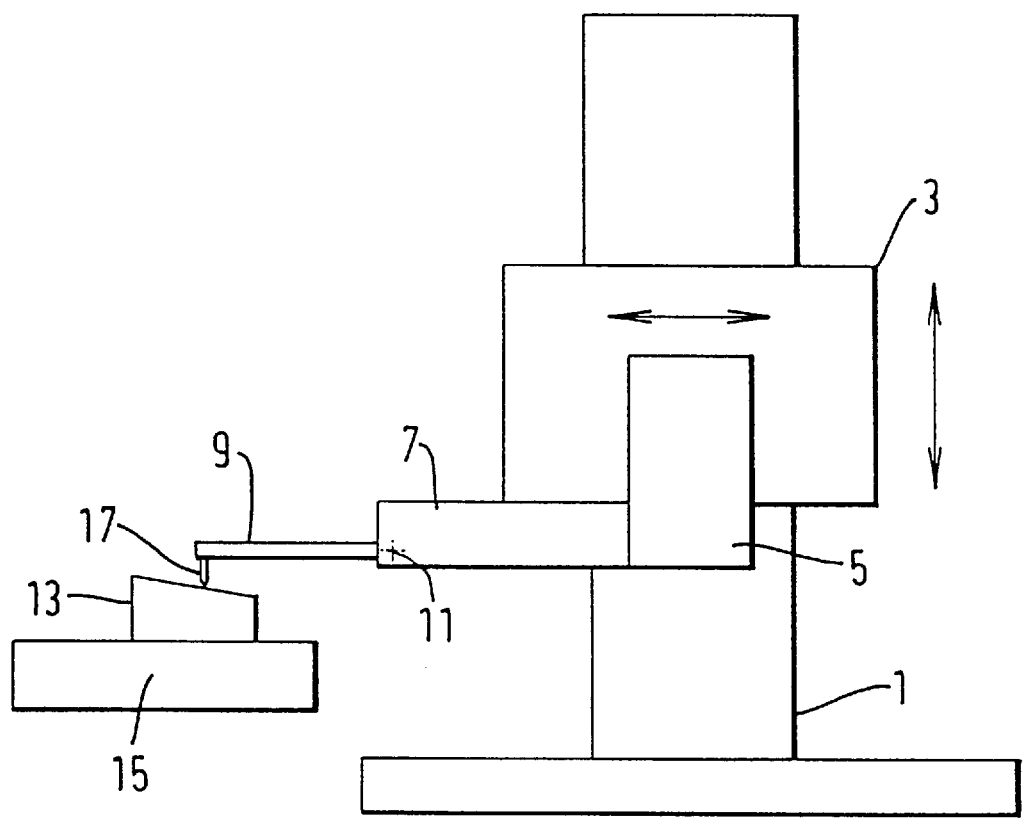
FIG. 1 shows schematically a metrological assembly.

FIG. 1 illustrates schematically a metrological assembly for measuring the surface properties (e.g. form or roughness) of a workpiece. In FIG. 1, a column and stand arrangement 1 supports a carriage 3 for vertical movement. The carriage 3 in turn supports a gauge holder 5 for horizontal movement. The gauge holder 5 supports a gauge 7, which supports a stylus 9 for pivotal movement about a horizontal pivot axis 11. A workpiece 13, the surface of which is to be measured in use, is mounted on a workpiece table 15.

In use, the gauge holder 5 moves horizontally to position a stylus tip 17, on the end of the stylus 9 remote from the gauge 7, over the surface of the workpiece 13. The carriage 3 then moves down to bring the stylus tip 17 into contact with the surface of the workpiece 13. The gauge holder 5 then moves horizontally to move the stylus tip 17 over the surface of the workpiece. Variations in the height of the surface of the workpiece 13 cause the stylus 9 to rotate about the pivot axis 11, and the gauge 7 contains a transducer for detecting such rotation of the stylus 9. The transducer output signal, when correlated with the horizontal movement of the gauge holder 5, provides information about the form or roughness of the surface of the workpiece 13.

Figure 2:
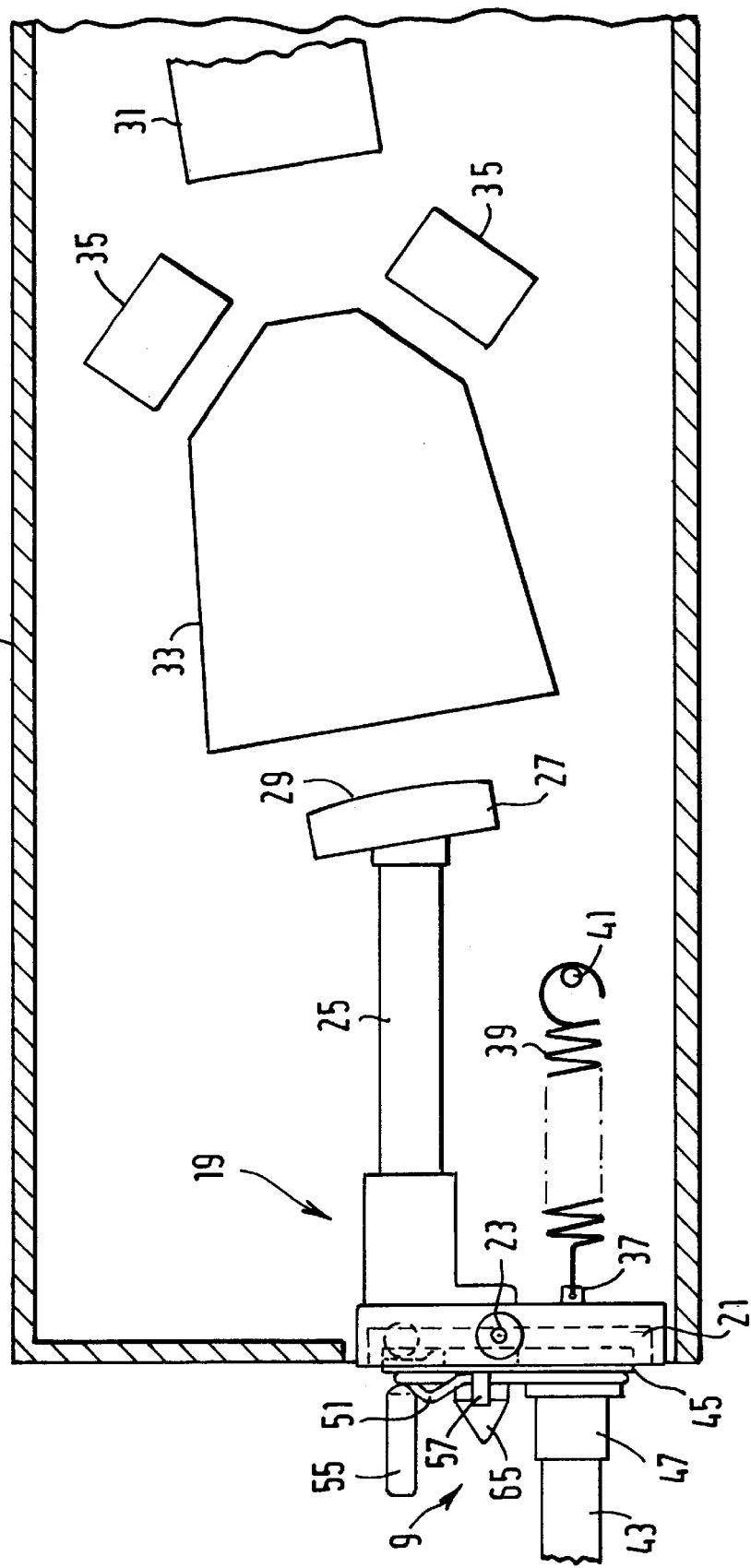
FIG. 2 shows some of the components inside the gauge of the assembly of FIG. 1 according to a first embodiment of the present invention.

FIG. 2 shows some of the components inside the gauge 7 in the vicinity of the pivot axis 11. At the end of the gauge 7 a pivotable stylus support 19 includes a mounting disc 21 on which the stylus 9 is removably mounted. The stylus support 19 is in turn pivotally mounted within the gauge 7 by pivot pins 23 provided at opposed locations on the circumference of the mounting disc 21. The pivot pins 23 are held in conventional three-ball cup bearings in the gauge 7, and this arrangement defines the pivot axis 11 for the stylus 9.

The stylus support 19 also includes an arm 25 which extends from the mounting disc 21 inside the gauge 7 towards the gauge holder 5. The end of the arm 25 supports a grating block 27 having a curved grating surface 29 on its side away from the mounting disc 21. Light from a laser 31 passes through a beam splitter and reflector optical block 33 to the curved grating surface 29, where the laser light is diffracted by the grating. The diffracted beams return to the optical block 33, where they are reflected and combined, and resulting interference patterns are formed on photodetectors 35. The laser 31, optical block 33 and photodetectors 35 are mounted so as to be stationary with respect to the gauge 7 whereas the curved grating surface 29 pivots about the pivot axis 11 defined by the pivot pins 23 as the stylus tip 17 moves up and down. This movement of the curved grating surface 29 will cause the interference patterns to move across the photodetectors 35, and in this way the gauge 7 operates to detect movement of the stylus tip 17. The details of this curved grating interferometric transducer are given in more detail in PCT specification W092/21934. It is shown here as an example of a transducer for detecting movement of the stylus tip 17. Other types of transducer could be used, such as an inductive linear variable differential transducer (LVDT).

The weight of the arm 25 and the grating block 27 substantially counter-balance the stylus 9. The stylus support 19 also includes an attachment pin 37 on the mounting disc 21, offset from the pivot axis 11. A coil spring 39 extends between the attachment pin 37 and a further pin 41 which is stationary with respect to the gauge 7. Accordingly, the force applied by the coil spring 39 between the attachment pin 37 and the further pin 41 tends to rotate the mounting disc 21, and therefore the stylus 9, to apply a pre-selected stylus force downwardly to the stylus tip 17.

The stylus 9 comprises a stylus arm 43, one end of which supports the stylus tip 17. The other end of the stylus arm 43 is mounted on a stylus mounting disc 45. The stylus mounting disc 45 is removably mounted on the mounting disc 21 of the stylus support 19 through a spring-loaded mounting arrangement which will now be described in more detail.

Figure 3:
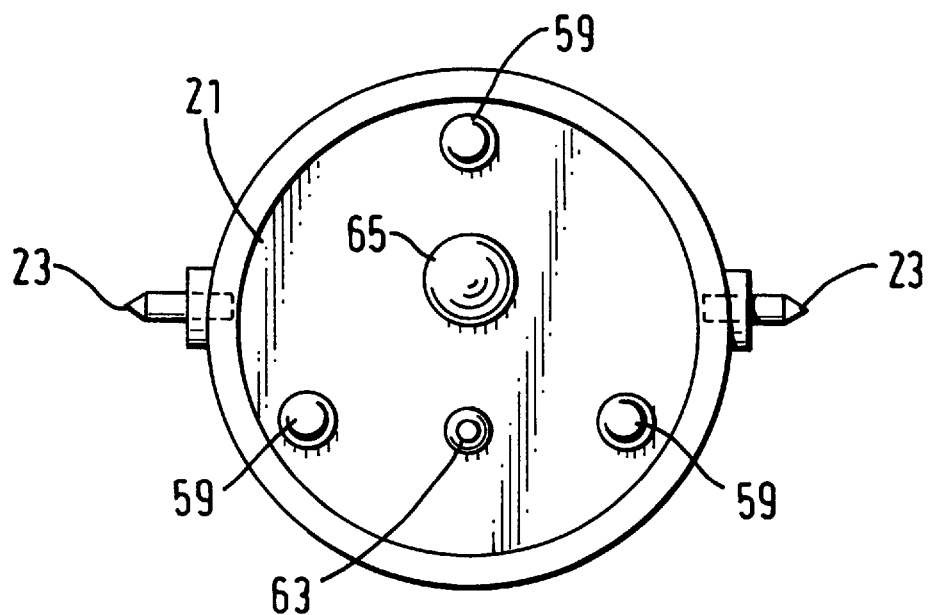
FIG. 3 is a view of the stylus support of FIG. 2 from the direction of the stylus tip.
Figure 4:
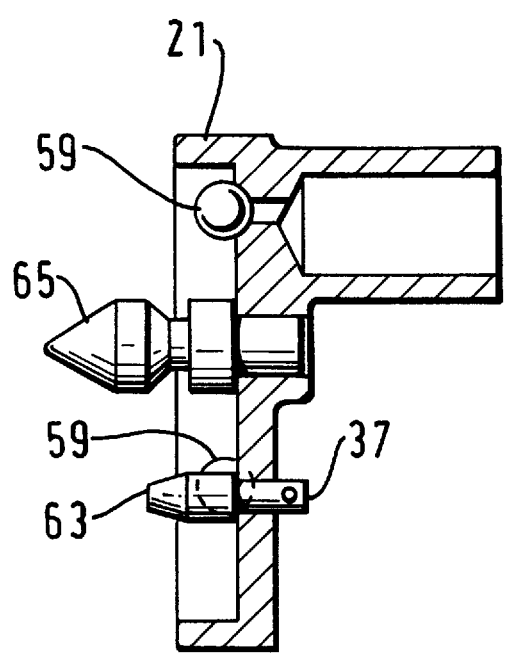
FIG. 4 is a vertical section of the stylus support of FIG. 3.
Figure 5:
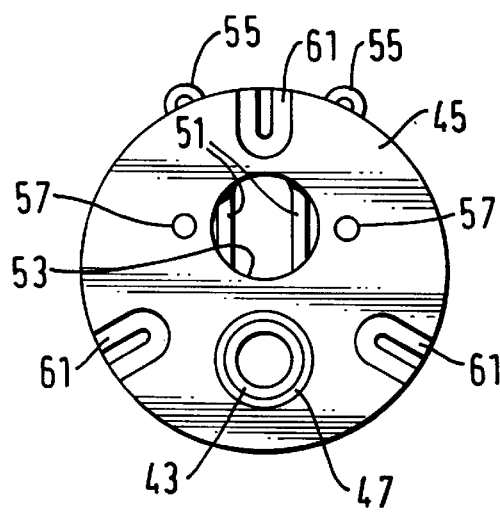
FIG. 5 is a view of the stylus ( omitting the stylus tip and part of the stylus arm) of FIG. 2 from the direction of the gauge.
Figure 6:
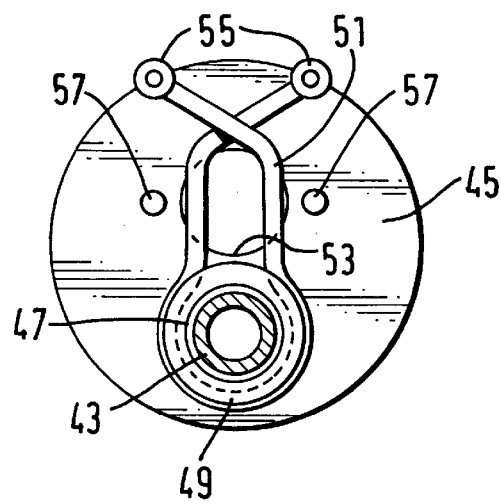
FIG. 6 is a view of the stylus from the direction of the stylus tip, taking a section through the stylus arm.
Figure 7:
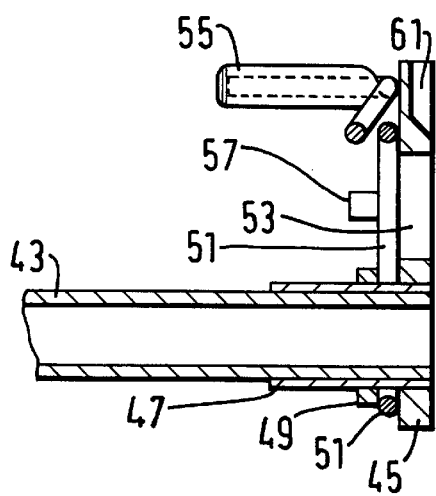
FIG. 7 is a vertical section through the stylus of FIG. 2 omitting the stylus tip and part of the stylus arm.
Figure 8:
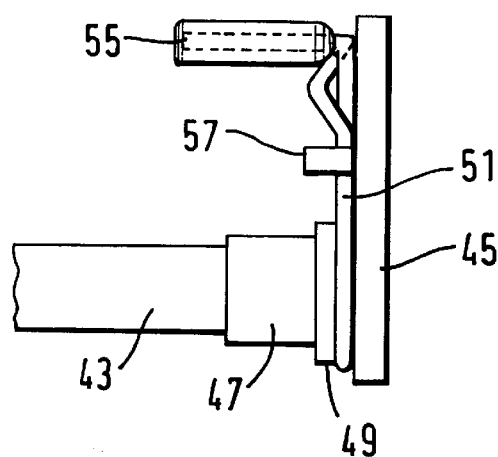
FIG. 8 is a side view of the stylus corresponding to FIG. 7.

FIG. 3 is a view of the stylus support 19 from the direction of the stylus tip 17, and FIG. 4 is a vertical section through the stylus support 19, omitting the arm 25 and the grating block 27. FIGS. 5 to 8 show the part of the stylus 9 close to the stylus support 19 in use, including the stylus mounting disc 45 and part of the stylus arm 43. FIG. 5 is a view from the direction of the gauge 7, FIG. 6 is a view from the direction on the stylus tip 17, FIG. 7 is a vertical section and FIG. 8 is a side view.

In FIG. 2 the stylus 9 is shown mounted on the stylus support 19 in FIGS. 3 to 8 the stylus support 19 and the stylus 9 are shown separately.

The stylus arm 43 is a hollow tube of carbon fibre. At its end towards the stylus mounting disc 45, it is reinforced by a metal sleeve 47 fitted tightly outside it.

As can be seen mostly clearly in FIG. 7, the stylus arm 43 and the metal sleeve 47 fit tightly within a hole in the stylus mounting disc 45, so that the disc carries the arm. The metal sleeve 47 reinforces the stylus arm 43 and helps to fix it to the stylus mounting disc 45.

A metal ring 49 is fitted on the sleeve 47, slightly spaced from the stylus mounting disc 45. The metal ring 49 may be formed separately or may be integral with the metal sleeve 47. A shaped wire spring 51 is captured between the metal ring 49 and the stylus mounting disc 45. The spring 51 follows the circumference of the metal sleeve 47 for sufficiently in excess of 180° that the spring 51 is held in position by the metal sleeve 47. From the metal sleeve 47 and the stylus arm 43, the spring 51 extends over the surface of the stylus mounting disc 45, past a mounting hole 53. Then the two arms of the spring 51 cross over, and their ends are turned away from the stylus mounting disc 45 to form actuating members to be squeezed together by an operator between thumb and forefinger. For the comfort of the operator, the ends of the spring 51 are fitted with sleeves 55 of a plastics material to increase the surface area gripped by the operator.

As can be seen in FIGS. 5 and 6, the spring 51 in its relaxed state overlaps the mounting hole 53 at opposite sides of its circumference. If the operator squeezes together the actuator members formed by the ends of the spring 51, the spring 51 is deformed into a position in which it is clear of the outline of the mounting hole 53.

The spring 51 is a loose fit around the metal sleeve 47, and can rotate around it. The spring 51 is maintained in the correct position extending from the metal sleeve 47 towards the mounting hole 53 by retaining pins 57 mounted in the stylus mounting disc 45 on either side of the mounting hole 53.

When the stylus mounting disc 45 is mounted on the support mounting disc 21, they contact each other through a three-point kinematic mount provided by three bearing balls 59 provided on the support mounting disc 21, which engage with three V-grooves 61 on the facing surface of the stylus mounting disc 45. If desired, the bearing balls 59 could be mounted on the stylus mounting disc 45 and the V-grooves 61 could be formed in the support mounting disc 21, but the illustrated arrangement will normally be more convenient to manufacture.

When the stylus mounting disc 45 is mounted on the support mounting disc 21, a locating pin 63 carried by the support mounting disc 21 fits into the open end of the stylus arm 43, helping to locate it with respect to the stylus support 19, and a camming pin 65 carried by the support mounting disc 21 passes through the mounting hole 53 in the stylus mounting disc 45. The spring 51 engages with a cam surface of the camming pin 65 so as to force the two discs 45, 21 together. For convenience, the locating pin 63 and the attachment pin 37 are formed integrally, but this is not essential.

Preferably, the camming pin 65 is mounted at the centre of the circle defined by the bearing balls 59. However, in practice it has been found necessary to place it slightly off centre, as can be seen in FIG. 3, in order to allow room on the stylus mounting disc 45 for the stylus arm 43 and metal sleeve 47 between the mounting hole 53 and the edge of the stylus mounting disc 45. In the illustrated embodiment, the stylus mounting disc 45 has a diameter of about 15 millimetres. If the diameter of the stylus mounting disc 45 and the spacing between the bearing balls 59 are increased, there will be room to position the camming pin 65 and the mounting hole 53 closer to the centre of the circle defined by the bearing balls 59. However, this increase in size may be inconvenient from the viewpoint of designing the gauge 7 to be compact, and additionally it will tend undesirably to increase the weight of the stylus mounting disc 45 and the support mounting disc 21.

Figure 9:
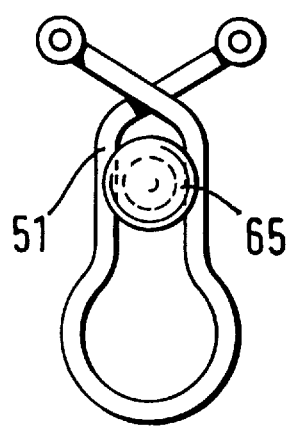
FIG. 9 is an enlarged view of the spring and the camming pin of the first embodiment from the direction of the stylus tip.
Figure 10:
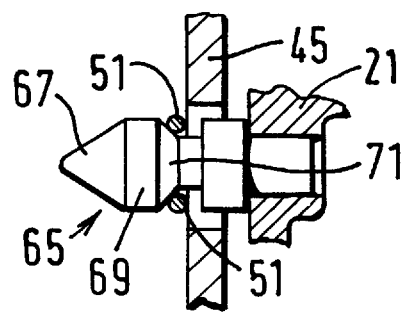
FIG. 10 is a partial horizontal section showing the spring and the camming pin.

FIG. 9 shows the spring 51 and the camming pin 65 engaged with each other, as seen from the direction of the stylus tip 17. FIG. 10 shows the stylus mounting disc 45 and the spring 51 in horizontal section together with the camming pin 65. The camming pin 65 has a conical leading surface 67, with a 30° half-cone angle, followed by a cylindrical surface 69, and then the cam surface 71 which is conical with a half-cone angle of 45° and faces in the opposite direction from the conical leading surface 67. The camming pin 65 is arranged so that the cam surface 71 is spaced from the face of the support mounting disc 21 by a distance which takes into account the spacing between the discs 45, 21 when they are kinematically mounted via the bearing balls 59 and V-grooves 61, the thickness of the stylus mounting disc 45 and the thickness of the wire of the spring 51, so that when the discs 45, 21 are mounted together the spring 51 contacts the camming pin 65 on the cam surface 71.

When the spring 51 contacts the cam surface 71 of the camming pin 65, as shown in FIGS. 9 and 10, the arms of the spring 51 are slightly further apart than in the relaxed condition of the spring 51, so that the spring 51 grips the camming pin 65. The reverse slope of the cam surface 71 converts the gripping force of the spring 51 into a force between the camming pin 65 and the spring 51 in the axial direction of the camming pin 65, tending to pull the camming pin 65 through the mounting hole 53, and forcing the spring 51 against the stylus mounting disc 45 and therefore forcing the stylus mounting disc 45 against the support mounting disc 21.

Figure 11:
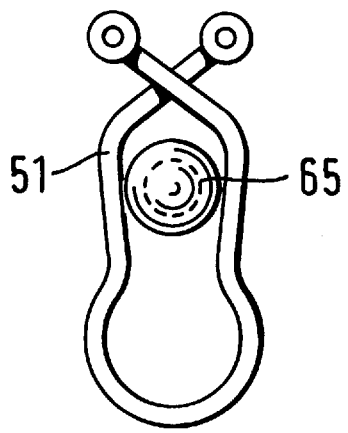
FIG. 11 is a view corresponding to FIG. 9 showing the spring in its retracted position.
Figure 12:
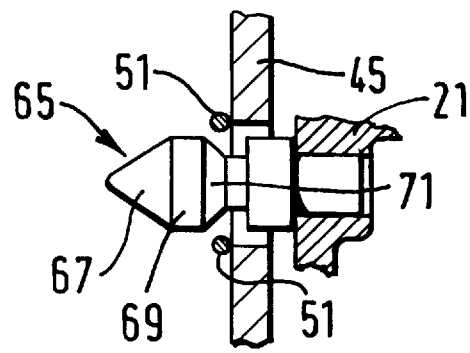
FIG. 12 is a section corresponding to FIG. 10 showing the spring in its retracted position.

In order to mount the stylus 9 on the stylus support 19, or to remove the stylus 9 from the stylus support 19, the operator squeezes together the actuating members formed by the ends of the spring 51, so that the arms of the spring 51 move apart from each other at the position of the mounting hole 53. FIG. 11 is a view corresponding to FIG. 9 and FIG. 12 is a view corresponding to FIG. 10, showing the position of the arms of the spring 51 in this condition. As can be seen from FIGS. 11 and 12, the arms of the spring 51 are now clear of the camming pin 65, allowing the camming pin 65 to pass unrestricted through the mounting hole 53 for mounting or dismounting the stylus 9.

Because the arms of the spring 51 are retracted away from the camming pin 65 and the mounting hole 53 while the stylus 9 is fitted to or removed from the gauge 7, these operations can be carried out without applying significant force to the bearings of the stylus support 19, thereby reducing the likelihood that the bearings will be undesirably stressed or damaged during stylus mounting or dismounting. Because the spring is loose around the metal sleeve 47, the spring 51 adopts a position in which it presses against the camming pin 65 with an equal force from each side, and because the two arms of the spring 51 extend substantially parallel to each other where they contact the camming pin 65 there is no net force applied to the spring 51 parallel to the plane of the stylus mounting disc 45. Accordingly, the spring 51 does not tend to push the stylus mounting disc 45 away from the position which it is held in by the three-point kinematic mount between the bearing balls 59 and the V-grooves 61. The force applied substantially normal to the plane of the stylus mounting disc 45, which holds the mounting discs 45, 21 against each other, is contained within a loop formed by the spring 51, the stylus mounting disc 45, the bearing balls 59, the support mounting disc 21, and the camming pin 65, and no fragile components or joints are stressed by this force.

During normal use of the illustrated metrological assembly, the pivot pins 23 and their associated bearings for the stylus support 19 have to resist the resultant force provided by the weight of the stylus 9, the weight of the stylus support 19, the force applied by the coil spring 39 which controls the stylus force, and the reaction to the stylus force applied by the workpiece 13 to the stylus tip 17. The forces applied to the stylus 9 will tend to peel the stylus 9 away from the stylus support 19, i.e. they will tend to rotate the stylus 9 about one of the bearing balls 59 so as to pull the stylus mounting disc 45 away from the support mounting disc 21. The force of the spring 51 against the camming pin 65 is sufficient to resist this, and hold the mounting discs 45, 21 together, for all the forces which are applied to the stylus 9 during an operation to measure a characteristic of the surface of the workpiece 13.

However, if an increased force is applied to the stylus arm 43, either by an accidental impact or because the stylus tip 17 has been lifted by the height of the workpiece 13 beyond the highest position it can adopt by pivoting of the stylus support 19, the forces tending to separate the stylus mounting disc 45 from the support mounting disc 21 will increase. Initially, the force holding the mounting discs 45, 21 together (generated by the spring 51) will be stronger than the force tending to separate them, and the increased force will be applied to the pivot pins 23 and their bearings. However, once the force tending to separate the mounting discs 45, 21 exceeds the force holding them together, the mounting discs 45, 21 will begin to separate and the camming pin 65 will begin to withdraw through the mounting hole 53. As the camming pin 65 withdraws, the spring 51 will move over the cam surface 71 of the camming pin 65, and the arms of the spring 51 will be forced apart, against the spring force of the spring 51. If the radial force on the stylus arm 43 is maintained, the spring 51 will ride over the cam surface 71 until it reaches the cylindrical surface 69 of the camming pin 65. At this point, the reaction between the spring 51 and the canning pin 65 will cease to provide a significant force holding the mounting discs 45, 21 together, and the discs will move rapidly apart, releasing the stylus 9 from the stylus support 19. Once the stylus 9 is released from the stylus support 19, the forces on the stylus arm 43 cease to stress the pivot pins 23 and bearings for the stylus support 19.

The magnitude of the force holding the mounting discs 45, 21 together, which must be overcome when they separate in response to a radial force on the stylus arm 43, is dependent on the magnitude of the spring force of the spring 51 and the angle of the cam surface 71 of the camming pin 65. In any particular case, this force should be selected so that it is sufficient to resist the forces which will be applied to the stylus arm 43 during a normal measurement operation. Provided that a suitable margin is maintained over the necessary minimum force for this purpose, it is advantageous to keep the force between the mounting discs 45, 21 low, so as to minimise the stress which will be applied to the pivot pins 23 and associated bearings if the stylus 9 is knocked off the stylus support 19 by a force applied radially to the stylus arm 43. It is presently proposed that, in an assembly in which the pivot-to-tip length of the stylus 9 is about 60 mm, the static stylus force of the stylus tip 17 against the workpiece 13 is up to about 1 mg force, the bearing balls 59 define an equilateral triangle each side of which is about 10 mm long, and the cam surface 71 is at 45° to the plane of the stylus mounting disc 45, a spring force applied to the cam surface 71 in the direction parallel to the stylus mounting disc 45 of about 10 grams force (about 0.1 newton) is the minimum necessary to hold the mounting discs 45, 21 securely together, and a spring force of about 100 grams force (about 1 newton) is preferred, provided that the camming pin 65 and the mounting hole 53 are close to the centre of the circle defined by the bearing balls 59.

In practice, if the gauge 7 is lowered too far and the stylus tip 17 is lifted so as to rotate the stylus support 19 onto its end stop, this situation will normally be detected and further lowering of the gauge 7 will be stopped before the stylus 9 separates completely from the stylus support 19. In this case, the spring 51 may have ridden part way over the cam surface 71 but not reached the cylindrical surface 69. If the gauge 7 is raised at this point, the stylus 9 will automatically move back into its correct position held against the stylus support 19. It has been found that, for a conventional carbon fibre tube stylus arm 43 in the range of 60 to 100 mm long and a conventional diamond-pointed stylus tip 17, a suitable spring strength can be found such that an incident as just described, in which the gauge 7 is lowered too far, causes no discernable damage to the stylus arm 43, the stylus tip 17 or the bearings for the stylus support 19, and following recalibration the performance of the gauge 7 matches its performance before the incident. When using the known mounting arrangement in which the end of the stylus is pushed into a stylus-receiving opening, if it is detected that the stylus support 19 has reached the end of its rotational range, it is often not possible to halt the gauge 7 in time to avoid damage to or destruction of at least one of the stylus tip 17, the stylus arm 43 and the bearings.

The conical shape of the leading surface 67 of the camming pin 65 makes it easier to fit it through the mounting hole 53 when mounting the stylus 9 onto the stylus support 19. Additionally, if the cone half angle of the leading surface 67 is made suitably small, it would be possible to mount the stylus 9 by pushing it onto the stylus support 19 and using the camming action between the leading surface 67 of the camming pin 65 and the spring 51 to separate the arms of the spring 51 so that it passes over the cylindrical surface 69 and engages with the cam surface 71. However, it is preferred not to do this, just as it is preferred to dismount the stylus 9 by squeezing together the ends of the spring 51 and releasing the action of the spring 51 on the cam surface 71, so as to minimise the force applied to the pivot pins 23 and associated bearings.

In principle, the camming pin 65 could be provided on the stylus mounting disc 45 and the spring 51 could be provided on the support mounting disc 21. However, the action of mounting or dismounting a stylus would probably be more awkward for the operator in this arrangement, and additionally any tremor in the operator's hand while squeezing together the ends of the spring 51 would tend to stress the pivot pins 23 and associated bearings. Additionally, the camming pin 65 tends to be more expensive to manufacture than the spring 51, and also needs to be positioned accurately (and shims may be provided between the camming pin 65 and the support mounting disc 21 to allow its position to be adjusted). It is normally more convenient to provide this relatively expensive part on the gauge 7, and allow the replaceable stylus 9 to be manufactured relatively cheaply.

In the illustrated embodiment, an excessive force applied radially to the stylus arm 43 will cause the stylus 9 automatically to separate from the stylus support 19 while applying only a limited force to the pivot pins 23 and associated bearings, thereby reducing the tendency of such excessive forces to damage the gauge 7.

The embodiment described above is given by way of example only, and various modifications are possible. For example, the spring 51 can be replaced by various other arrangements for applying a releasable force to the camming pin 65, as will now be described.

FIG. 13 is a view corresponding to FIG. 9, for a second embodiment of the present invention. In this embodiment, the spring 51 is replaced by an arrangement comprising first and second levers 73, 75 both mounted midway along their lengths to rotate on a common pin 77. One end of each lever 73, 75 is curved to fit round a part of the circumference of the cam surface 71 of the camming pin 65. At the other end of each lever 73, 75 a handle 79, 81 is provided extending away from the stylus mounting disc 45. A spring 83 extends around the handles 79, 81 and around the pin 77.

The spring 83 acts on the handles 79, 81 forcing them apart, so that the other ends of the levers 73, 75 are forced together, gripping the cam surface 71 of the camming pin 65. This provides a force which tends to hold the stylus mounting disc 45 against the support mounting disc 21, in the same manner as in the first embodiment. In order to release the camming pin 65 from this force, to allow the stylus 9 to be mounted or dismounted, the handles 79, 81 are squeezed together against the force of the spring 83, moving the other ends of the levers 73, 75 away from the camming pin 65. The levers 73, 75 are freely rotatable about the pin 77. A further pin 85 is provided on the stylus mounting disc 45 between the arms of the levers 73, 75 which hold the handles 79, 81, to keep the illustrated arrangement correctly positioned with the other ends of the levers 73, 75 extending from the pin 77 towards the mounting hole 53 even in the absence of the camming pin 65.

The ends of the levers 73, 75 are movable in the directions shown by the arrows 87 in FIG. 13.

If an excessive force is applied to the stylus arm 43, the mounting discs 45, 21 will begin to separate and the camming pin 65 will begin to withdraw through the mounting hole 53. When this occurs, the arms of the levers 73, 75 which grip the camming pin 65 are forced apart against the action of the spring 83, to allow the stylus 9 to be released from the stylus support 19 in a manner similar to that described with reference to the first embodiment.

FIG. 14 is a view similar to FIGS. 9 and 13, of a third embodiment of the present invention. In this embodiment a U-shaped spring strip 89 is provided, slidable over the surface of the stylus mounting disc 45. In the position shown in FIG. 14, the spring strip 89 grips the camming pin 65 between parts of its arms which are curved so as to fit around opposed parts of the circumference of the cam surface 71 of the camming pin 65. In this position, the arms of the spring strip 89 are further apart than when the spring strip 89 is relaxed, and accordingly the spring strip 89 is stressed so as to apply force to the cam surface 71. The spring strip 89 acts to force the stylus mounting disc 45 against the support mounting disc 21 in the same manner as the spring 51 of the first embodiment.

The spring strip 89 is retained in its position illustrated in FIG. 14 because the curvature of the parts which grip the camming pin 65 mean that the spring strip 89 can only be moved out of engagement with the camming pin 65 by forcing the ends of the spring strip 89 apart.

In order to move the spring strip 89 manually, a pin 91 is provided on the spring strip 89 at the base of its U-shape, a first fixed pin 93 is provided on the stylus mounting disc 45 between the pin 91 and the mounting hole 53 for the camming pin 65, and a second fixed pin is provided on the stylus mounting disc 45 on the side of the pin 91 away from the mounting hole 53 for the camming pin 65. In order to release the stylus 9 from the stylus support 19, the pin 91 on the spring strip 89 and the second fixed pin 95 are squeezed together, forcing the spring strip 89 to move over the stylus mounting disc 45 away from the camming pin 65, so that the camming pin 65 is no longer between the arms of the U-shaped spring strip 89 and is therefore released.

In order to mount the stylus 9 onto the stylus support 19, the parts are brought together while the spring strip 89 is in its retracted position with its pin 91 close to the second fixed pin 95. Once the camming pin 65 has passed fully through the mounting hole 53, the pin 91 on the spring strip 89 and the first fixed pin 93 are squeezed together, sliding the spring strip 89 towards the camming pin 65 so that the ends of the spring strip 89 pass either side of the camming pin 65. As shown in FIG. 14, the end portions of the spring strip 89 are angled away from each other so as to guide the arms of the spring strip 89 reliably around the camming pin 65.

Further pins 97, mounted on the stylus mounting disc 45 one each side of the spring strip 89 keep the open end of the spring strip 89 correctly aligned with the mounting hole 53 in the absence of the camming pin 65.

The sliding movement of the spring strip 89 between the position in which it grips the camming pin 65, as illustrated in FIG. 14, and the position in which it is retracted, will tend to move the camming pin 65 and the support mounting disc 21 slightly relative to the stylus mounting disc 45. However, following slight movement the base of the camming pin 65 will contact the edge of the mounting hole 53 in the stylus mounting disc 45, and further movement is restrained, so that this movement does not tend to stress the pivot pins 23 and their associated bearings.

If excessive force is applied to the stylus arm 43, moving the mounting discs 45, 21 apart and retracting the camming pin 65 through the mounting hole 53, the arms of the spring strip 89 move apart against the spring force of the spring strip 89, so as to allow the cam surface 71 and then the cylindrical surface 69 of the camming pin 65 to pass between them. Unlike the first and second embodiments, the movement of the spring strip 89 for intentional mounting and dismounting of the stylus 9 (sliding movement in the directions of arrow 99) is different from the movement for automatic release of the stylus 9 following excessive force on the stylus arm 43 (movement apart of the ends of the spring strip 89 in the directions of arrow 101 by deforming the spring strip 89).

FIG. 15 is a view of a fourth embodiment of the present invention, corresponding to FIGS. 9, 13 and 14. FIG. 16 is a view of the fourth embodiment from the direction of arrow XVI in FIG. 15 and FIG. 17 is a view of the fourth embodiment from the direction of arrow XVII in FIG. 15. The camming pin 65 is shown in FIGS. 15 and 16, but is omitted in FIG. 17 for clarity.

In the fourth embodiment, a slidable spring strip is made up of arms 103, 105, which extend over the surface of the stylus mounting disc 45 and are joined by a central portion 107 which is bent up to extend, away from the stylus mounting disc 45 as can be seen in FIGS. 16 and 17. The arms 103, 105 diverge slightly, and a biassing spring 109 extending between two fixed pins 111, 113 on the stylus mounting disc 45 presses the central portion 107 of the spring strip towards the mounting hole 53 and the camming pin 65 to keep the arms 103, 105 of the spring strip firmly in engagement with the cam surface 71 of the camming pin 65, as shown in FIG. 15.

In the position shown in FIG. 15, the arms 103, 105 of the spring strip press towards each other, and therefore act on the cam surface 71 to provide a force holding the stylus mounting disc 45 against the support mounting disc 21 as in the other embodiments. Because the arms 103, 105 are not quite parallel, there is also a small resultant force parallel to the plane of the stylus mounting disc 45, corresponding to the force of the biassing spring 109 on the central portion 107 of the spring strip.

In order to retract the arms 103, 105 of the spring strip away from the camming pin 65 to allow the stylus 9 to be mounted onto the stylus support 19 or dismounted from it, the central portion 107 of the spring strip is squeezed against a fixed pin 115 on the stylus mounting disc 45, so that the spring strip slides over the surface of the stylus mounting disc 45 away from the mounting hole 53 and the camming pin 65, against the bias of the biassing spring 109. When the central portion 107 and fixed pin 115 are released, the biassing spring 109 drives the spring strip back towards the mounting hole 53 (and the camming pin 65 if the stylus 9 is mounted on the stylus support 19). This automatic return action, as with the first and second embodiments, is more convenient than the arrangement of the third embodiment in which the spring strip 89 has to be moved positively into the position for engaging the camming pin 65.

Two further pins 117 are provided adjacent the arms 103, 105 of the spring strip to ensure that it continues to be oriented correctly with the arms 103, 105 extending towards the mounting hole 53 even in the absence of the camming pin 65.

As can be seen in FIG. 16, the central potion 107 of the spring strip is provided with a notch for retaining the biassing spring 109.

If excessive force is applied to the stylus arm 43, tending to separate the mounting discs 45, 21 and retracting the camming pin 65 through the mounting hole 53, the spring strip can bend so that the ends of the arms 103, 105 move further apart (mostly by bending in the central portion 107), or the spring strip as a whole may slide against the action of the biassing spring 109 so that the arms 103, 105 are further apart at the points where they contact the camming pin 65. In practice, both effects occur to some extent.

It should be noted that in FIG. 16, the pins 111, 113 and 117 are omitted for clarity. In FIG. 17 only the spring strip, the biassing spring 109, the pins 111 and 113 and part of the stylus mounting disc 45 are shown and the other parts are omitted for clarity.

FIGS. 13 to 17 do not show any means for keeping the levers 73, 75, the spring strip 89, or the spring strip made up of arms 103, 105 and central portion 107 against the surface of the stylus mounting disc 45 when the stylus 9 is dismounted from the stylus support 19. Any convenient arrangement may be used. For example, in the second embodiment of FIG. 13 the pin 77 holding the levers 73, 75 may have an enlarged head. In the third and fourth embodiments the further pins 97, 117 may have enlarged heads extending over the respective spring strips or further retaining pieces may be mounted on the stylus mounting disc 45.

Various modifications and further embodiments will be apparent to those skilled in the art. For example, the shape of the camming pin 65 may be varied. Furthermore, the cam surface 71 may be provided on a different member, other than a camming pin which passes through a hole in the stylus mounting disc 45. For example, one or more parts may be provided on the support mounting disc 21 which extend past the periphery of the stylus mounting disc 45 and provide respective sloping cam surfaces 71 which can be engaged by resiliently biassed members on the stylus mounting disc 45 to drive the mounting discs 45, 21 together. An example of such an arrangement is shown in FIGS. 18 and 19.

Figure 18:
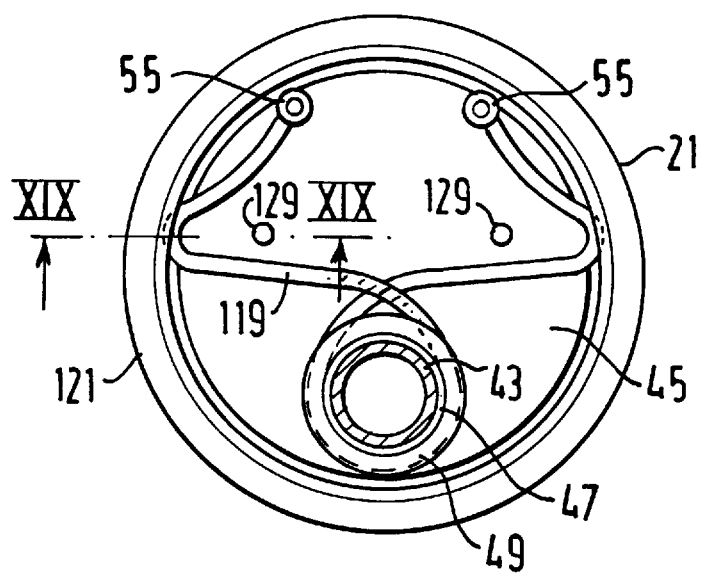
FIG. 18 is a view of a fifth embodiment from the direction of the stylus tip, taking a section through the stylus arm.

FIG. 18 is a view of the stylus mounted on the stylus support in a fifth embodiment of the present invention, seen from the direction of the stylus tip 17, and with the stylus arm 43 in section. The camming arrangement of the fifth embodiment is also illustrated in FIG. 19 which is a partial view of a section through the support mounting disc 21 and the stylus mounting disc 45 in the fifth embodiment, along the line XIX—XIX in FIG. 18.

The concept of the fifth embodiment is similar to the concept of the first embodiment, but there is no camming pin 65 and mounting hole 53. A spring 119 passes around the base of the stylus arm 43 and the metal sleeve 47, and is retained by the metal ring 49, in the same manner as in the first embodiment. However, the arms of the spring 119 extend away from each other over the surface of the stylus mounting disc 45 to form elbows which extend over the edge of the stylus mounting disc 45 at positions which are approximately diametrically opposite each other, before extending over the stylus mounting disc 45 again to provide upturned ends having plastic sleeves 55 to provide actuating members.

Figure 19:
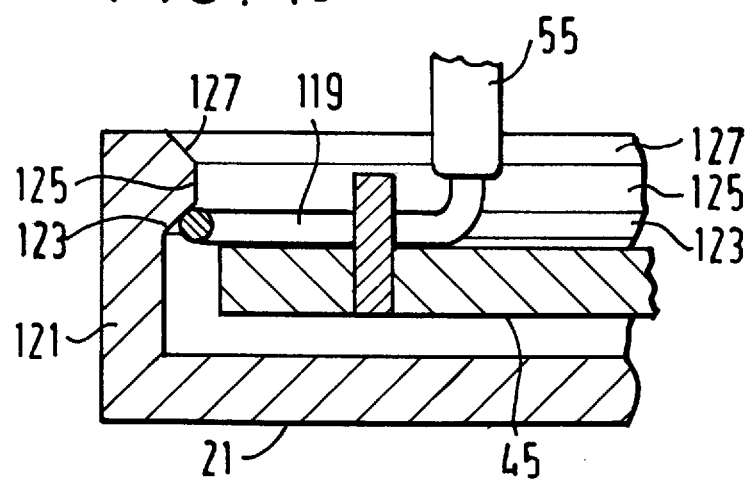
FIG. 19 is a partial sectional view of the fifth embodiment on the line XIX—XIX in FIG. 18.

As is best shown in FIG. 19, the support mounting disc 21 has a circumferential rim wall 121 which extends past the edge of the stylus mounting disc 45, and then has a cam surface 123 which is angled to extend obliquely inwards towards the axis of the mounting discs 21, 45, a cylindrical surface 125, and then a leading surface 127 which extends obliquely outwards. These surfaces correspond to the cam surface 71, the cylindrical surface 69 and the leading surface 67 of the camming pin 65 in the first embodiment. The radius of the stylus mounting disc 45 is slightly less than the radius of the cylindrical surface 125, so that the stylus mounting disc 45 can move towards and away from the support mounting disc 21 past the cylindrical surface 125. However, the elbows of the spring 119 extend over the edge of the stylus mounting disc 45, and engage the cam surface 123 when the stylus mounting disc 45 is mounted on the support mounting disc 21. In the relaxed position of the spring 119, the elbows of the spring are slightly further apart than is permitted by their engagement with the cam surface 123, and accordingly the elbows of the spring 119 press against the cam surface 123, generating an axial force which urges the stylus mounting disc 45 and the support mounting disc 21 towards each other. In order to mount or dismount the stylus 9, the turned up ends of the spring 119 with sleeves 55 are squeezed together, further stressing the spring 119 and moving the elbows of the spring 119 slightly to withdraw them from the cam surface 123 to lie fully over the mounting disc 45. With the spring 119 stressed into this position, the stylus 9 can be removed from or brought up to the stylus support 19.

As in the first embodiment, the spring 119 is a loose fit around the metal sleeve 47, and therefore can adopt a position in which the sideways forces on the two elbows of the spring 119 cancel each other out. Pins 129 on the surface of the stylus mounting disc 45 limit the extent to which the spring 119 can rotate about the stylus arm 43, to ensure that the spring 119 remains in the correct orientation when the stylus 9 is not mounted on the stylus support 19

In FIGS. 18 and 19 the cam surface 123, the cylindrical surface 125 and the leading surface 127 are shown as extending around the full circumference of the rim wall 121 of the support mounting disc 21. However, as will be appreciated by those skilled in the art, this is not necessary, and these surfaces may be provided only in the regions of the rim wall 121 engaged by the elbows of the spring 119.

Further modifications and alternatives will be apparent to those skilled in the art.

I claim:

1. A stylus assembly for a metrological instrument, comprising a stylus and a stylus support contactable through kinematic mounting means defining a kinematic mounting plane, and releasably held together by an attachment force generated by the action of a resiliently biassed surface of a part of one of the stylus and the stylus support on a reaction surface of the other of the stylus and the stylus support, wherein the resiliently biassed surface and the reaction surface are arranged so that movement of the stylus and the stylus support away from each other causes relative movement of the resiliently biassed surface over the reaction surface and also causes movement of the resiliently biassed surface against its resilient bias until a relative position is reached in which the attachment force is no longer generated.

2. A stylus assembly for a metrological instrument, said stylus assembly being adapted to pivot about a pivot axis in response to a characteristic of a measurement surface and comprising a stylus and a stylus support releasably held together by an attachment force generated by the action of a resiliently biassed surface of a part of one of the stylus and the stylus support on a reaction surface of the other of the stylus and the stylus support, wherein the resiliently biassed surface and the reaction surface are arranged so that movement of the stylus and the stylus support away from each other causes relative movement of the resiliently biassed surface over the reaction surface and also causes movement of the resiliently biassed surface against its resilient bias until a relative position is reached in which the attachment force is no longer generated.

3. An assembly according to claim 1 or claim 2 in which the resiliently biassed surface is a surface of a resiliently deformable member which is deformed to generate the resilient bias.

4. An assembly according to claim 2, in which the resiliently deformable member has first and second end portions shaped so that the first and second end portions cross over and are each coupled by a respective attachment portion to an intermediate portion.

5. An assembly according to claim 1 or claim 2 in which the resiliently biassed surface is a surface of a member which is biassed by a further, resiliently deformable member.

6. An assembly according to claim 1 or claim 2 in which the resiliently biassed surface is biassed in a direction substantially at right angles to the direction of the attachment force.

7. An assembly according to claim 1 or claim 2 in which the resiliently biassed surface is a surface of a part of the stylus and the reaction surface is a surface of a part of the stylus support.

8. An assembly according to claim 1 or claim 2 in which the resiliently biassed surface is a surface of a part of the stylus support and the reaction surface is a surface of a part of the stylus.

9. An assembly according to claim 1 or claim 2 in which the stylus extends longitudinally in the direction of the attachment force.

10. An assembly according to claim 1 or claim 2 in which one of the stylus and the stylus support has an opening for receiving a pin on the other of the stylus and the stylus support, the reaction surface being a surface of the pin.

11. An assembly according to claim 1 or claim 2 in which one of the stylus and the stylus support has an angled leading surface tending to bring the stylus and the stylus support into the correct relative position as they are brought together.

12. An assembly according to claim 11 in which the leading surface is provided on the same member as the reaction surface.

13. An assembly according to claim 12 in which, at a relative position of the stylus and the stylus support offset in the direction of separation from the relative position in which they are held by the attachment force, the resiliently biassed surface acts on the leading surface and generates a force tending, to separate the stylus and the stylus support.

14. An assembly according to claim 12 in which there is a surface extending generally parallel to the attachment force between the reaction surface and the leading surface.

15. A stylus assembly according to claim 2, wherein said stylus and said stylus support are connectable through kinematic mounting means defining a kinematic mounting plane.

16. An assembly according to claim 1, in which said kinematic mounting means comprises three bearing balls located on a first coupling surface of one of said stylus and said stylus support and three grooves located on a second coupling surface on the other of said stylus and said stylus support, each of said bearing balls being arranged to engage a respective one of said grooves to provide alignment between said stylus and said stylus support.

17. A part for a stylus assembly for a metrological instrument, the part being one of a longitudinally extending stylus and a stylus support for supporting a stylus, the part comprising:

kinematic mounting means for contacting a corresponding kinematic-mounting means on the other of the longitudinally extending stylus and the stylus support to define a kinematic mounting plane: and a member with one of (i) a surface which is resiliently loaded in a direction having a component transverse to the longitudinal direction of the part, for abutment against an oblique surface of the other of the longitudinally extending stylus and the stylus support, and (ii) a surface which is oblique to the longitudinal direction of the part, for abutment against a surface of the other of the longitudinally extending stylus and the stylus support which is resiliently loaded in a direction having a component transverse to the longitudinal direction of the part, to generate a force holding the stylus onto the stylus support.

18. A stylus assembly for a metrological instrument comprising a stylus and a stylus support contactable through kinematic mounting means defining a kinematic mounting plane, one of the stylus and the stylus support comprising:

a resiliently biassed member operable to act on a part of the other of the stylus and the stylus support to hold the stylus and the stylus support together in a stylus-held state; and first and second release members which are movable relative to each other to change at least one of the position a the shape of the resiliently biassed member so that the resiliently biassed member is a stylus-released state and does not act on said part and the stylus and the stylus support can be separated from each other or moved together.

19. A stylus assembly for a metrological instrument, said stylus assembly being adapted to pivot about a pivot axis in response to a characteristic of a measurement surface and comprising a stylus and a stylus support, one of the stylus and the stylus support comprising:

a resiliently biassed member operable to act on a part of the other of the stylus and the stylus support to hold the stylus and the stylus support together in a stylus-held state; and first and second release members which are movable relative to each other to change at least one of the position and the shape of the resiliently biassed member so that the resiliently biassed member adapts a stylus-released state and does not act on said part and the stylus and the stylus support can be separated from each other or moved together.

20. A stylus assembly according to claim 18 or claim 19 in which the first and second release members are movable relative to each other, to change the state of the resiliently biassed member from the state to the stylus-released state, without requiring relative movement between the stylus and the stylus support.

21. A stylus assembly according to claim 18 or claim 19 in which the first release member is provided on the resiliently biassed member and the second release member is fixed relative to the said one of the stylus and the stylus support.

22. A stylus assembly according to claim 21 in which relative movement of the first and second release members changes the position of the resiliently biassed member on the said one of the stylus and the stylus support.

23. A stylus assembly according to claim 18 or claim 19 in which the first and second release members are both provided on the resiliently biassed member.

24. A stylus assembly according to claim 18 or 19 in which relative movement of the first and second release members, to change the state of the resiliently biassed member from the stylus-held state to the stylus-released state, changes the shape of the resiliently biassed member.

25. A stylus assembly according to claim 24 in which the bias force of the resiliently biassed member is applied between the first and second release members in the stylus-released state.

26. A stylus assembly according to claim 19 in which the first and second release members are both provided on the same side of the pivot axis so that the pivotal movement of the stylus does not cause relative movement between the first and second actuator means.

27. A stylus assembly according to claim 18 or claim 19 in which the stylus comprises the resiliently biassed member and the first and second release members.

28. A stylus assembly according to claim 18 or claim 19 in which the first and second release members are movable towards each other to change the state of the resiliently biassed member from the stylus-held state to the stylus-released state.

29. A stylus assembly according to claim 19, wherein said stylus and said stylus support are connectable through kinematic mounting means defining a kinematic mounting plane.

30. A stylus assembly according to claim 18, in which said kinematic mounting means comprises three bearing balls located on a first coupling surface of one of said stylus and said stylus support and three grooves located on a second coupling surface on the other of said stylus and said stylus support, each of said bearing balls being arranged to engage a respective one of said grooves to provide alignment between said stylus and said stylus support.

31. A component for a stylus assembly for a metrological instrument, the component being one of a stylus and a stylus support, said component comprising:

kinematic mounting means for contacting a corresponding kinematic mounting means on the other of the stylus and the stylus support to define a kinematic mounting plane;

a resiliently biassed member for acting, when in a stylus-held state, on a part of the other of the stylus and the stylus support to hold the stylus and the stylus support together; and first and second release members which are movable relative to each other to change the position or the shape of the resiliently biassed member to a stylus-released state in which the resiliently biassed member does not act on the said part and the stylus may be separated from or moved towards a stylus support.

32. A metrological instrument for measuring a characteristic of a measurement surface, having a stylus assembly comprising a stylus and a stylus support contactable through kinematic mounting means defining a kinematic mounting plane, and releasably held together by an attachment force generated by the action of a resiliently biassed surface of a part of one of the stylus and the stylus support on a reaction surface of the other of the stylus and the stylus support, wherein the resiliently biassed surface and the reaction surface are arranged so that movement of the stylus and the stylus support away from each other causes relative movement of the resiliently biassed surface over the reaction surface and also causes movement of the resiliently biassed surface against its resilient bias until a relative position is reached in which the attachment force is no longer generated.

33. A metrological instrument for measuring a characteristic of a measurement surface, having:

a main body;

pivot mountings located on said main body; and a stylus assembly coupled to the main body of the metrological instrument via said pivot mountings so that the stylus assembly is pivotable about a pivot axis in response to the characteristic of the measurement surface, said stylus assembly comprising a stylus and a stylus support releasably held together by an attachment force generated by the action of a resiliently biassed surface of a part of one of the stylus and the stylus support on a reaction surface of the other of the stylus and the stylus support, wherein the resiliently biassed surface and the reaction surface are arranged so that movement of the stylus and the stylus support away from each other causes relative movement of the resiliently biassed surface over the reaction surface and also causes movement of the resiliently biassed surface against its resilient bias until a relative position is reached in which the attachment force is no longer generated.

34. A metrological instrument according to claim 33, wherein said stylus and said stylus support are connectable through kinematic mounting means defining a kinematic mounting plane.

35. A stylus assembly for a metrological instrument, comprising a stylus and a stylus support contactable through kinematic mounting means defining a kinematic mounting plane, said stylus support comprising a first coupling surface and a projection projecting from said first coupling surface, said projection having a first portion and a second portion, adjacent said first portion and between said first portion and said first coupling surface, whose cross-sectional area decreases in the direction towards said first coupling surface, and said stylus comprising a second coupling surface having an opening for receiving said projection and two resiliently deformable members which in their relaxed state, obstruct said opening, and two release members which are movable relative to each other to change the shape of at least one of the two resiliently deformable members, said resiliently deformable members and said release members being arranged so that, when said stylus assembly is assembled, said resiliently deformable members act on the surface of said second portion to hold the stylus and the stylus support together in a stylus-held state and said release members are movable to alter the shape of at least one of the resiliently deformable members to a stylus-released state of the resiliently deformable members in which the resiliently deformable members do not act on said second portion and the stylus and the stylus support can be separated from each other or moved together in said stylus-released state.

36. A metrological instrument for measuring a characteristic of a measurement surface, having a stylus assembly comprising a stylus and a stylus support contactable through kinematic mounting means defining a kinematic mounting plane, one of the stylus and the stylus support comprising:

a resiliently biassed member operable to act on a part of the other of the stylus and the stylus support to hold the stylus and the stylus support together in a stylus-held state; and first and second release members which are movable relative to each other to change at least one of the position and the shape of the resiliently biassed member to a stylus-released state so that the resiliently biassed member does not act on said part and the stylus and the stylus support can be separated from each other or moved together.

37. A metrological instrument for measuring a characteristic of a measurement surface, having:

a main body;

pivot mountings located on said main body; and a stylus assembly coupled to the main body of the metrological instrument via said pivot mountings so that the stylus assembly is pivotable about a pivot axis in response to the characteristic of the measurement surface, said stylus assembly comprising a stylus and a stylus support, one of the stylus and the stylus support comprising:

a resiliently biassed member operable to act on a part of the other of the stylus and the stylus support to hold the stylus and the stylus support together in a stylus-held state; and first and second release members which are movable relative to each other to change at least one of the position and the shape of the resiliently biassed member to a stylus-released state in which the resiliently biassed member does not act on said part and the stylus and the stylus support can be separated from each other or moved together.

38. A metrological instrument according to claim 37, wherein said stylus and said stylus support are connectable through kinematic mounting means defining a kinematic mounting plane.

39. A metrological instrument for measuring a characteristic of a measurement surface, said metrological instrument having:

a main body;

pivot mountings located on said main body; and a stylus assembly coupled to the main body of the metrological instrument via said pivot mountings so that the stylus assembly is pivotable about a pivot axis in response to the characteristic of the measurement surface, said stylus assembly comprising a stylus and a stylus support, said stylus support comprising a first coupling surface and a projection projecting from said first coupling surface, said projection having a first portion and a second portion, adjacent said first portion and between said first portion and said first coupling surface, whose cross-sectional area decreases in the direction towards said first coupling surface, and said stylus comprising a second coupling surface having an opening for receiving said projection and two resiliently deformable members which, in their relaxed state, obstruct said opening and two release members which are movable relative to each other to change the shape of at least one of the two resiliently deformable members, said resiliently deformable members and said release members being arranged so that, when said stylus assembly is assembled, said resiliently deformable members act on the surface of said second portion to hold the stylus and the stylus support together and said release members are movable to alter the shape of at least one of the resiliently deformable members so that the resiliently deformable members do not act on said second portion and the stylus and the stylus support can be separated from each other or moved together.

40. A stylus assembly for a metrological instrument, comprising a stylus and a stylus support, said stylus support comprising:

a first coupling surface;

a first projection projecting from said first coupling surface, said first projection having a cylindrical first portion, circular in cross-section and a second portion, adjacent said first portion and between said first portion and said first coupling surface, whose cross-sectional area decreases in the direction towards said first coupling surface, a second projection projecting from said first coupling surface; and three bearing balls provided on said first coupling surface;

and said stylus comprising:

a disc having two opposing sides, one opposing side defining a second coupling surface;

three grooves located on said coupling surface;

a first opening in said disc;

a second opening in said disc;

a rod mounted in said second opening so that said rod protrudes from the other opposing side of said disc;

a stylus tip mounted at one end of the rod;

a recess formed in the other end of the rod;

a flange located near the other end of the rod; and a resilient member having first and second end portions shaped so that the first and second end portions cross over and are each coupled by a respective attachment portion to an intermediate portion, the intermediate portion being captured between said flange and said other opposing side of said disc to secure the resilient member, said attachment portions being arranged to obstruct said first opening in their relaxed state and said end portions being arranged to project away from said other opposing side of said disc;

wherein said second projection is adapted to engage the recess in said rod to provide coarse alignment between said stylus and said stylus support;

each of said bearing balls is arranged to engage a respective one of said grooves to provide precision alignment between said stylus and said stylus support;

said end portions of said resilient member are manually operable to deform said resilient member so that said attachment portions do not obstruct said first opening and the first projection can freely move in and out of said first opening;

said attachment portions, when said stylus assembly is assembled, act on said second portion of said projection to generate an attachment force to hold said stylus and said stylus support together; and movement of said stylus and said stylus support away from each other causes said attachment members to traverse the surface of said second portion until said attachment members act on the surface of said first portions and said attachment force is no longer generated.

41. A metrological instrument for measuring a characteristic of a measurement surface, having a stylus assembly comprising a stylus and a stylus support, said stylus support comprising:

a first coupling surface;

a first projection projecting from said first coupling surface, said first projection having a cylindrical first portion, circular in cross-section and a second portion, adjacent said first portion and between said first portion and said first coupling surface, whose cross-sectional area decreases in the direction towards said first coupling surface, a second projection projecting from said first coupling surface; and three bearing balls provided on said first coupling surface;

and said stylus comprising:

a disc having two opposing sides, one opposing side defining a second coupling surface;

three grooves located on said coupling surface; a first opening in said disc;

a second opening in said disc;

a rod mounted in said second opening so that said rod protrudes from the other opposing side of said disc;

a stylus tip mounted at one end of the rod;

a recess formed in the other end of the rod;

a flange located near the other end of the rod; and a resilient member having first and second end portions shaped so that the first and second end portions cross over and are each coupled by a respective attachment portion to an intermediate portion, the intermediate portion being captured between said flange and said other opposing side of said disc to secure the resilient member, said attachment portions being arranged to obstruct said first opening in their relaxed state and said end portions being arranged to project away from said other opposing side of said disc;

wherein said second projection is adapted to engage the recess in said rod to provide coarse alignment between said stylus and said stylus support;

each of said bearing balls is arranged to engage a respective one of said grooves to provide precision alignment between said stylus and said stylus support;

said end portions of said resilient member are manually operable to deform said resilient member so that said attachment portions do not obstruct said first opening and the first projection can freely move in and out of said first opening;

said attachment portions, when said stylus assembly is assembled, act on said second portion of said projection to generate an attachment force to hold said stylus and said stylus support together; and movement of said stylus and said stylus support away from each other causes said attachment members to traverse the surface of said second portion until said attachment members act on the surface of said first portions and said attachment force is no longer generated.

* * * * *

UNITED STATES PATENT AND TRADEMARK OFFICE
CERTIFICATE OF CORRECTION

PATENT NO. : 5,847,270    Page 1 of 3
DATED : December 8, 1998
INVENTOR(S) : Nettleton It is certified that error appears in the above-identified patent and that said Letters Patent is hereby corrected as shown below:

On the Title Page, in item [86], "§ 371 Date: Jun. 13, 1997" should read
--§ 371 Date: May 21, 1997--.

On the Title Page, in item [86], "§ 102(e) Date: Jun. 13, 1997" should read
--§ 102(e) Date: May 21, 1997--.

Column 1, line 7, "particular-application" should read --particular application--.

Column 1, line 12, "instrument," should read --instruments,--.

Column 3, line 9, "articular" should read --particular--.

Column 3, line 47, after "as" insert -- the--

Column 3, line 64, delete "of".

Column 6, line 25, "support 19 in" should read --support 19. In--.

UNITED STATES PATENT AND TRADEMARK OFFICE
CERTIFICATE OF CORRECTION

PATENT NO.  : 5,847,270
DATED       : December 8, 1998
INVENTOR(S) : Nettleton

It is certified that error appears in the above-identified patent and that said Letters Patent is hereby corrected as shown below:

Column 6, line 30, "mostly" should read --most--.

Column 8, line 31, "21," should read --21--.

Column 9, line 45, after "not" insert --have--.

Column 10, line 42, "round" should read --around--.

Column 12, line 21, "extend," should read --extend--.

Column 13, line 27, "extend" should read --extends--.

Column 13, line 28, "provide" should read --provides--.

Column 15, line 1, "2," should read --3,--.

UNITED STATES PATENT AND TRADEMARK OFFICE
CERTIFICATE OF CORRECTION

PATENT NO. : 5,847,270
DATED : December 8, 1998
INVENTOR(S) : Nettleton

It is certified that error appears in the above-identified patent and that said Letters Patent is hereby corrected as shown below:

Column 15, line 40 "tending," should read --tending--.

Column 15, line 62, "kinematic-mounting" should read --kinematic mounting--.

Column 16, line 20, "a" should read --or--.

Column 16, line 44, "the" (first occurrence) insert --stylus-held--.

Column 16, line 59 "or" insert --claim--.

Signed and Sealed this

Fourth Day of May, 1999

*Attest:*

Q. TODD DICKINSON

*Attesting Officer*     *Acting Commissioner of Patents and Trademarks*